United States Patent
Steinert et al.

(10) Patent No.: US 9,481,469 B2
(45) Date of Patent: Nov. 1, 2016

(54) VALVE FOR CONTROLLING THE INTERNAL PRESSURE IN A CABIN OF AN AIRCRAFT

(71) Applicant: NORD-MICRO AG & CO. OHG, Frankfurt (DE)

(72) Inventors: Martin Steinert, Seligenstadt (DE); Dusan Vranjes, Frankfurt (DE)

(73) Assignee: Nord-Micro GmbH & Co. OHG, Frankfurt (DE)

( * ) Notice: Subject to any disclaimer, the term of this patent is extended or adjusted under 35 U.S.C. 154(b) by 353 days.

(21) Appl. No.: 14/238,081

(22) PCT Filed: Mar. 5, 2013

(86) PCT No.: PCT/EP2013/054433
§ 371 (c)(1),
(2) Date: Feb. 10, 2014

(87) PCT Pub. No.: WO2013/135534
PCT Pub. Date: Sep. 19, 2013

(65) Prior Publication Data
US 2014/0227956 A1    Aug. 14, 2014

(30) Foreign Application Priority Data

Mar. 16, 2012    (DE) .......................... 10 2012 204 217

(51) Int. Cl.
*B64D 13/04* (2006.01)
*B64D 13/02* (2006.01)
*F16K 39/02* (2006.01)
*F16K 1/22* (2006.01)

(52) U.S. Cl.
CPC ............... *B64D 13/04* (2013.01); *B64D 13/02* (2013.01); *F16K 1/221* (2013.01); *F16K 39/028* (2013.01)

(58) Field of Classification Search
CPC ...... B64D 13/00; B64D 13/02; B64D 13/04; F16K 1/221; F16K 39/028
USPC .......................................... 454/71, 73, 74, 76
See application file for complete search history.

(56) References Cited

U.S. PATENT DOCUMENTS 3,426,984 A * 2/1969 Emmons ................ B64D 13/02
                                                        244/117 R
3,544,045 A * 12/1970 Butscher ................ B64D 13/02
                                                        244/129.1

(Continued)

FOREIGN PATENT DOCUMENTS

DE        19713125 A1    10/1998
DE    102009010150 A1     9/2010

(Continued)

OTHER PUBLICATIONS

International Search Report in corresponding International Application No. PCT/EP2013/054433 dated May 24, 2013 (4 pages).

(Continued)

*Primary Examiner* — Gregory Huson
*Assistant Examiner* — Dana Tighe
(74) *Attorney, Agent, or Firm* — Thomas B. Ryan; Harter Secrest & Emery LLP

(57) ABSTRACT

The invention relates to a valve for controlling the internal pressure in a cabin of an aircraft. First and second flaps supported in a frame control a fluid flow between the environment and the cabin through an opening of the valve. The first flap is supported at a distance from a front edge of the frame and the second flap is supported on a rear edge of the frame. A closing device closes an outflow opening (56) in an inflow position of the flaps, which outflow opening is bounded by the flaps. The closing device is pivotably supported on one of the flaps, and interacts with the locking device in such a way that the closing device closes the outflow opening in the event of a pivoting motion of the flaps.

20 Claims, 2 Drawing Sheets

(56) References Cited

U.S. PATENT DOCUMENTS

| | | | | |
|---|---|---|---|---|
| 4,960,249 | A | * | 10/1990 | Signoret ................ B64D 13/02 244/118.5 |
| 6,273,136 | B1 | * | 8/2001 | Steinert ................ B64D 13/02 137/601.08 |
| 2010/0001127 | A1 | * | 1/2010 | Petrac .................... B64D 13/04 244/1 R |
| 2010/0096503 | A1 | | 4/2010 | Tanner et al. |
| 2010/0216385 | A1 | * | 8/2010 | Heuer ..................... B64D 13/02 454/71 |
| 2013/0210330 | A1 | | 8/2013 | Steinert et al. |

FOREIGN PATENT DOCUMENTS

| | | |
|---|---|---|
| DE | 102010033827 A1 | 2/2012 |
| WO | 2012019796 A1 | 2/2012 |
| WO | 2013135534 A1 | 9/2013 |

OTHER PUBLICATIONS

First Office Action received from the State Intellectual Property Office of People's Republic of China (Application No. 201380002091.6.

International Preliminary Report on Patentability in corresponding International Application No. PCT/EP2013/054433 dated Sep. 16, 2014 (5 pages).

Communication of the intention to grant a European Patent from the European Patent Office in corresponding European Patent Application No. 13 709 380.3 at the regional stage of corresponding International Application No. PCT/EP2013/054433.

* cited by examiner

VALVE FOR CONTROLLING THE INTERNAL PRESSURE IN A CABIN OF AN AIRCRAFT

TECHNICAL FIELD

The present invention relates to a valve for controlling the internal pressure in an aircraft cabin, comprising a first flap and a second flap supported in a frame, wherein the flaps control a pressure-changing fluid flow between the environment and the cabin through an opening of the valve, wherein the first flap is supported at a distance from a front edge of the frame and the second flap on a rear edge of the frame.

BACKGROUND OF THE INVENTION

Valves of this type are used for controlling the pressure within an airplane cabin or a pressure chamber. For controlling the pressure in an airplane cabin, the valve is placed in an opening of the airplane fuselage. Depending on the position of the valve, air can flow in or out. Thus, the pressure in the cabin can be increased or reduced using the valve. Furthermore, the used-up air located in the airplane cabin can be discharged via the valve.

A valve having two adjustable flaps is apparent from DE 10 2009 010 150 A1. Depending on the position of the flaps, air flows either out of or into the airplane cabin. The two flaps are supported in an opening of the valve frame. The tail-side flap has a cover which, in the inflow position of the flaps, covers a tail-side opening region in order to prevent an outflow of air between the tail-side flap and the valve framing in the tail-side opening region.

It is the object of the invention to provide a valve of the kind mentioned in the introduction, which reliably prevents an outflow of the air in an inflow position.

SUMMARY OF THE INVENTION

In the valve according to the invention, a closing device is provided which, in an inflow position of the flaps, closes an outflow opening delimited by the flaps. The closing device is pivotably supported on one of the flaps. A locking device, which cooperates with the closing device in such a way that the closing device closes the outflow opening during the pivoting movement of the flaps, is provided along with the closing device.

The valve according to the invention is used for controlling the internal pressure of the aircraft. The valve is located, for example, in the outer skin of the aircraft, and opens and closes the opening that establishes a connection between the cabin and the aircraft environment. In a first opening position, which is also referred to as the outflow position, preferably both flaps are slightly tilted, so that air can flow towards outside from the cabin. Since the internal pressure of the cabin is usually higher than the pressure of the environment at the cruising altitude of aircraft, the air flows from the cabin towards the outside.

In the event of an unforeseen pressure loss in the cabin, preferably both flaps are pivoted into an inflow position, in which the first flap protrudes into an airflow flowing past the aircraft. Thus, a particularly large amount of air is guided from the environment into the cabin.

If the airplane descends from the cruising altitude at the same time, the internal pressure in the cabin can thus be increased.

In the inflow position, the valve according to the invention closes the outflow opening by means of the closing device, so that it is no longer possible for the air that has flowed in to flow out. Advantageously, the amount of the fluid flow that has flowed in increases thereby, because a discharge through the outflow opening can be prevented. The closing of the outflow opening by the closing device is effected by the locking device provided along with the closing device.

Another advantage of the valve according to the invention is that no additional actuator, such as an electric motor or the like, is required for pivoting the closing device relative to the first flap. This eliminates the danger of a failure of the actuating motor and renders the valve according to the invention lighter and more cost-effective.

Advantageously, the closing device is configured as a closing flap. In this case, the first flap can comprise at least one supporting arm on which the closing device is pivotably supported.

Advantageously, the locking device comprises at least one bolt and an catch cooperating with the bolt, wherein, when the flaps are pivoted into the inflow position, the bolt can be accommodated by the catch in order to transfer the closing flap into a locking position.

Advantageously, the bolt is supported eccentrically with respect to a pivot axis of the closing device. The closing device is brought into connection with the catch via the bolt by a pivoting movement of the first flap, and the closing device pivots due to the eccentricity of the bolt. The closing device is thus transferred into the locking position. In the locking position, the closing device closes the outflow opening.

Advantageously, a purely mechanical cooperation between the bolt and the catch is provided in the above-described locking device. This renders the closing device particularly resistant to failure because no actuator is provided.

In an advantageous embodiment, the at least one bolt is disposed on the closing device. Advantageously, the catch is disposed on the frame.

Accordingly, the catch is arranged in a stationary manner relative to the first flap or the closing device. The pivoting movement of the first flap, and thus of the closing device, feeds the bolt towards the catch. Advantageously, the closing device is pivoted by the bolt latching into the catch.

Advantageously, at least one spring cooperating with the at least one supporting arm is disposed on the closing device, in order to bias the closing device from the locking position into a closing position when the flaps are pivoted into the inflow position.

In an advantageous embodiment, the first flap and the second flap are interconnected via at least one coupling rod.

Advantageously, an actuating device is provided, with which the flaps can be adjusted from the closed position into the outflow position and the inflow position.

The advantage of the coupling rod is that only one actuating device is required for pivoting the first flap and the second flap between the closed position, the outflow position and the inflow position.

Advantageously, the flaps can be adjusted in the same direction by means of the actuating device. Also advantageously, the second flap is connected to the actuating device via an actuating rod.

An advantageous embodiment provides that the first flap is supported approximately centrally on the frame, and that the second flap is supported at the edge of the frame.

BRIEF DESCRIPTION OF THE DRAWING FIGURES

The invention is explained below in more detail with reference to an exemplary embodiment that is schematically depicted in the drawings. In the Figures.

DETAILED DESCRIPTION OF THE INVENTION

Figure 1:
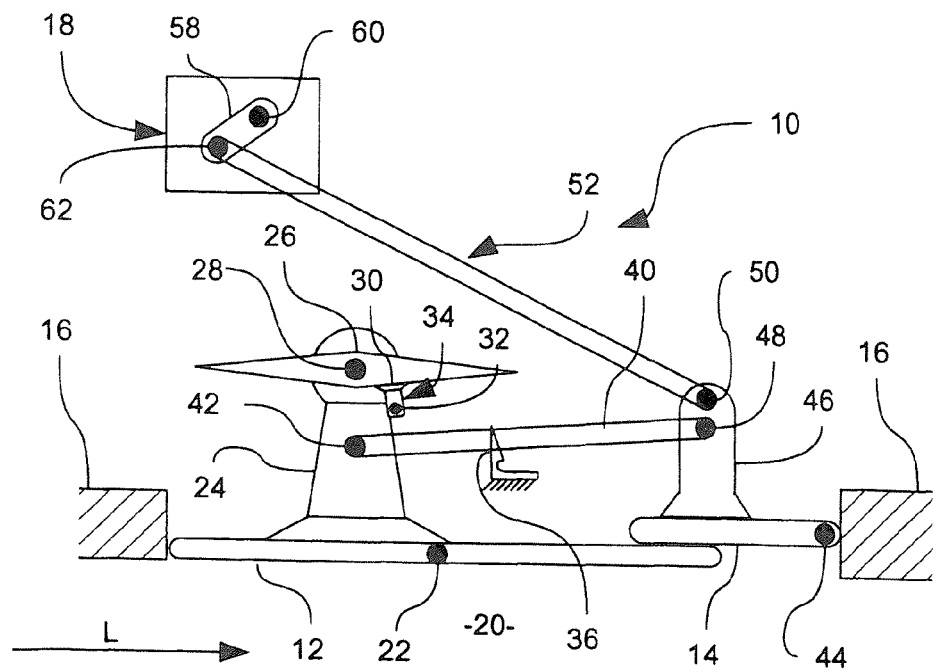
FIG. 1 shows a cross section of the valve according to the invention in a closed position of the flaps.

FIG. 1 shows a valve 10 comprising a first nose-side flap 12, a second tail-side flap 14, a frame 16 and an actuating device 18. The valve has an opening 20 delimited by the frame 16. The opening 20 has a rectangular cross section. In a closed position, the first flap 12 and the second flap 14 close the opening 20. This is shown in FIG. 1.

The first flap 12 is pivotable about a first pivot axis 22, which is attached approximately in the center of the opening 20. Two spaced-apart supporting arms 24, to which a closing device 26 is attached, are provided on the first flap 12. Owing to the cross-sectional representation of the valve 10, only one supporting arm 24 is depicted in FIGS. 1 to 4. The closing device 26 is configured as a closing flap. The closing device 26 is attached to the supporting arm 24 via a third pivot axis 28, so that the closing device 26 is pivotably supported on the supporting arm 24.

The closing device 26 is biased against the two supporting arms 24 by means of two springs 27. The springs 27 are fastened to the closing device 26 and the supporting arm 24. Therefore, without the influence of external forces, the closing device 26 fixed relative to the supporting arm 24 and the first flap 12. For a clear presentation, the spring 27 is depicted only in the FIGS. 2 and 3. The spring 27 is a mechanical tension spring. Another embodiment, which is not shown, provides a coil spring supported on the third pivot axis 28. The coil spring also biases the closing device 26 against the supporting arm 26.

The supporting arm 24 is attached to the first flap 12 eccentrically with respect to the first pivot axis 22. The closing device 26 has two projections 30, with a bolt 32 being molded on to each of them. Owing to the cross-sectional representation of the valve 10, only one projection 30 and one bolt 32 are depicted in the FIGS. 1 to 4. The bolts 32 each face the frame 16 and are arranged eccentrically with respect to the third pivot axis 28. Therefore, the first flap 12 comprises two supporting arms 24, two projections 30 and two bolts 32. The projection 30 and the bolt 32 form a part of a locking device 34. A catch 36 forms the second part of the locking device. Two catch 36 are attached to the frame 16 on opposite sides.

A first pivot mounting 42, on which a coupling rod 40 is supported, is provided on the supporting arm 24. The coupling rod 40 is provided on only one of the two supporting arms 24 of the first flap 12.

The second flap 14 is pivotable about a second pivot axis 44 that is disposed adjacent to the frame 16 and ends flush with the frame 16. In the closing position, the second flap 14 overlaps the first flap 12, so that the opening 20 is closed by the flaps 12 and 14.

A controlling projection 46 having a second pivot mounting 48 and a third pivot mounting 50 is provided on the second flap 14. The coupling rod 40 is pivotably supported on the second pivot mounting 48. Thus, the second flap 14 is connected to the first flap 12 via the coupling rod 40.

Moreover, an actuating rod 52 is pivotably supported on the controlling projection 46 via the third pivot mounting 50.

The actuating device 18 comprises a crank 58 connected to a drive shaft 60. The crank 58 is pivotably connected to the actuating rod 52 via a fourth pivot mounting 62. The actuating device 18 comprises an actuator, e.g. an electric motor, which drives the drive shaft 60. Via the crank 58 and the actuating rod 52, the second flap 14 is pivoted by means of the second controlling projection 46.

The first 12 and the second flaps 14 and the closing device 26 can comprise projections or other means that improve the airflow along the flaps 12, 14.

Figure 2:
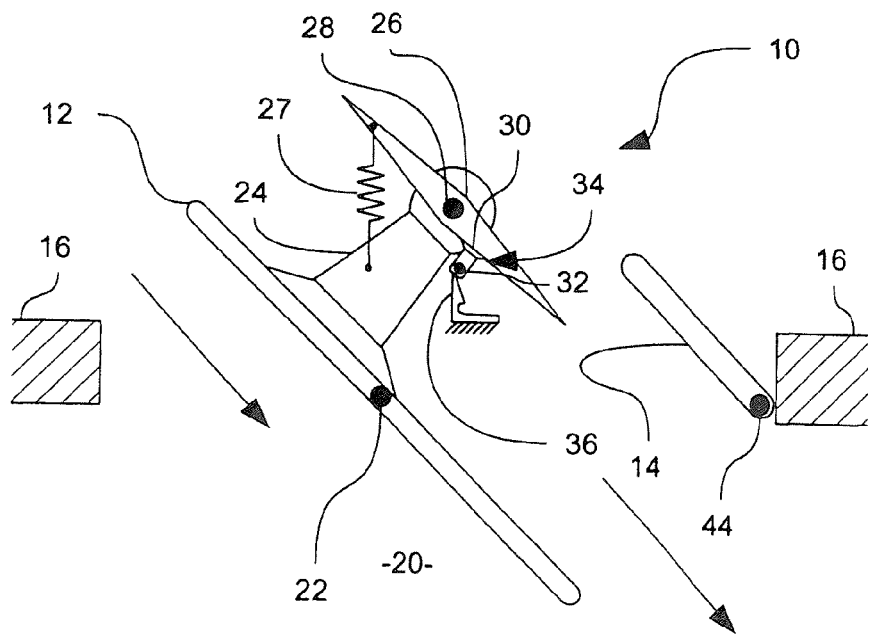
FIG. 2 shows a cross section of the valve according to the invention in an outflow position of the flaps.

FIG. 2 shows the valve 10 without the actuating device 18 and the controlling projection 46. The actuating device 18 pivots the first flap 12 and the second flap 14 clockwise into the outflow position shown in FIG. 2, in which air can flow from the cabin into the environment. Since the first flap 12 and the second flap 14 are interconnected via the coupling rod 40, the flaps 12 and 14 move synchronously. Due to the spring bias of the spring 27, the closing device 26 is not pivoted relative to the supporting arm 24 and the first flap 12 because the bolt 32 does not touch the catch 36 yet.

Figure 3:
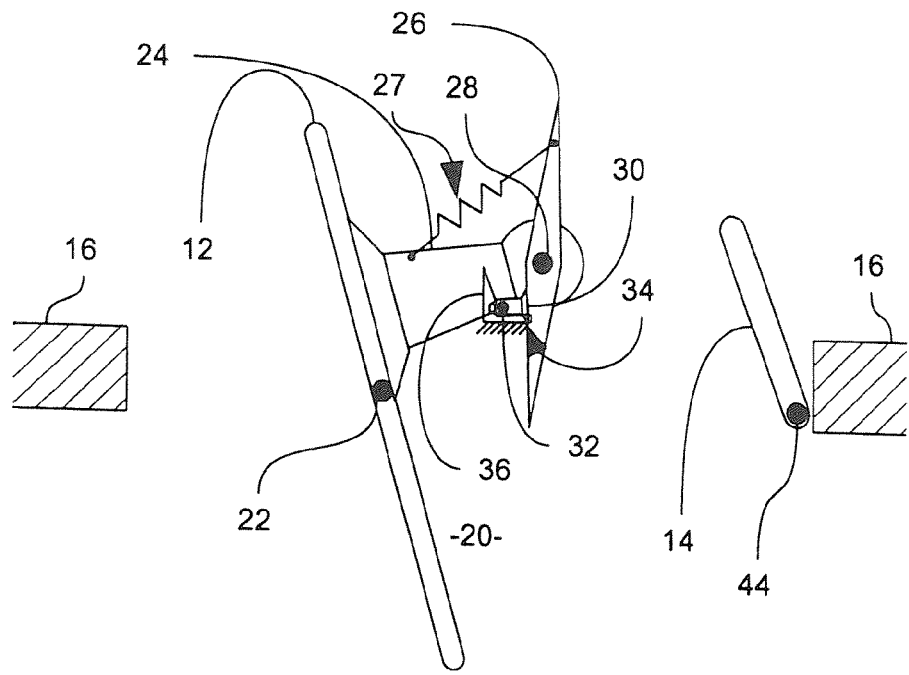
FIG. 3 shows a cross section of the valve according to the invention in a second tilted position of the flaps.

In the position of the flaps 12 and 14 shown in FIG. 3, the bolt 32 of the closing device 26 latches into the catch 36. Because the bolt 32 is eccentrically supported with respect to the third pivot axis 28, the eccentricity of the bolt 32, due to the pivoting movement of the first flap 12, causes a clockwise rotation of the closing device 26 relative to the first flap 12. The spring 27 is thereby expanded.

Figure 4:
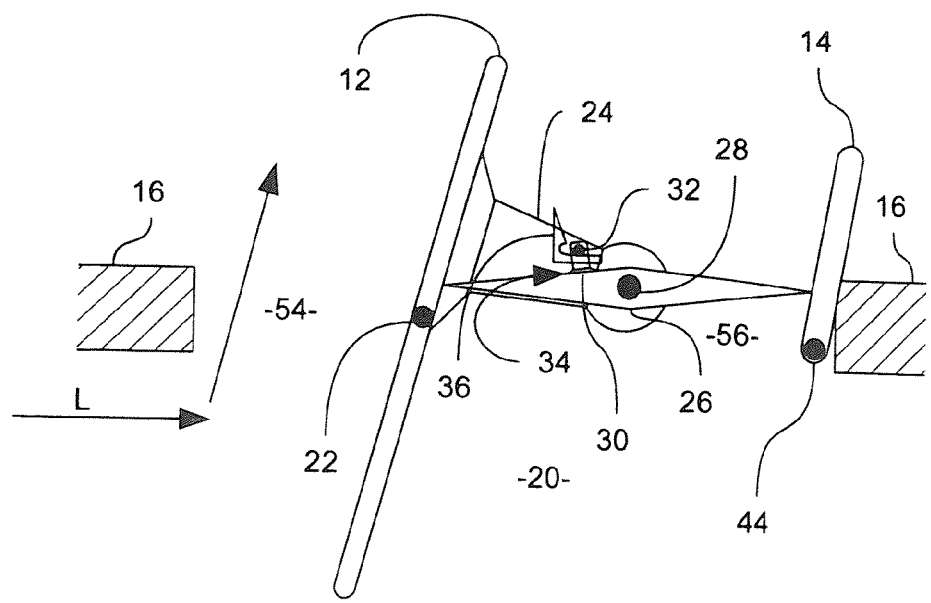
FIG. 4 shows a cross section of the valve according to the invention in an inflow position of the flaps.

FIG. 4 shows the flaps 12 and 14 in the inflow position. The first flap 12 divides the opening 20 in this position into an inflow opening 54 and an outflow opening 56. In the inflow position, the closing device 26 is rotated about the third pivot axis 28 by the locking device 34 in such a way that the closing device 26 closes the outflow opening 56 between the first flap 12 and the second flap 14. In the process, the end edges of the closing device 26 touch the first flap 12 and the second flap 14. In the inflow position, the first flap 12 protrudes into the fluid flow L.

The mode of operation of the valve 10 is now to be described in more detail.

In the closed position shown in FIG. 1, the first flap 2 and the second flap 14 close the opening 20 completely, so that no air can flow from the cabin to the environment or vice versa.

The flaps 12 and 14 can be moved into the outflow position shown in FIG. 2 by means of the actuating device 18. In this position, air can flow from the cabin into the environment. Further movement of the actuating device 18 causes a further pivoting of the flaps 12 and 14.

At the beginning of this pivoting movement, the bolt 32 does not touch the catch 36 yet. In the case of a further pivoting movement, the bolt 32 touches the catch 36, whereby a relative pivoting movement of the closing device 26 with respect to the first flap 12 is caused, as this is shown in FIG. 3.

Upon reaching the inflow position according to FIG. 4, the closing device 26 is pivoted relative to the first flap 12 to such a pronounced extent that the closing device 26 closes the outflow opening 56 completely. The closing device 26 is then in a locking position. At the same time, the first flap 12 protrudes into the fluid flow L in such a way that the fluid flow L is guided into the cabin. The closing device 26 prevents the air that has flowed in through the inflow opening 54 from flowing out through the outflow opening 56, whereby the total amount of the fluid flow L flowed into the cabin can be increased.

An advantage of the valve 10 according to the invention is that no separate actuator is required for pivoting the closing device 26. The valve 10 thus has a simpler structure and can be manufactured cost-effectively, because no actuator is needed. Furthermore, the outflow opening 56 is closed solely by means of the rotation of the flaps 12 and 14 and the rotation of the closing device 26 caused thereby, because a purely mechanical interaction is provided between the closing device 26 and the catch 36. No actuator that could become inoperative and would thus diminish the inflow of air is provided in the valve 10.

LIST OF REFERENCE NUMERALS

10 Valve
12 First flap
14 Second flap
16 Frame
18 Actuating device
20 Opening
22 First pivot axis
24 Supporting arm
26 Closing device
27 Spring
28 Third pivot axis
30 Projection
32 Bolt
34 Locking device
36 Catch
40 Coupling rod
42 First pivot mounting
44 Second pivot axis
46 Controlling projection
48 Second pivot mounting
50 Third pivot mounting
52 Actuating rod
54 Inflow opening
56 Outflow opening
58 Crank
60 Drive shaft
62 Fourth pivot mounting
L Fluid flow

The invention claimed is:

1. A valve for controlling internal pressure in an aircraft cabin, comprising:
   a first flap and a second flap supported in a frame, wherein the first and second flaps control a pressure-changing fluid flow between the aircraft cabin and an environment outside the aircraft cabin through an opening of the valve,
   the first flap being supported at a distance from a front edge of the frame and the second flap being supported at a rear edge of the frame,
   a closing device which, during an inflow position of the first and second flaps, blocks an outflow opening delimited by the first and second flaps,
   the closing device being pivotably supported on one of the first and second flaps, and
   a locking device, which cooperates with the closing device in such a way that the closing device closes the outflow opening during a pivoting movement of the first and second flaps, is provided along with the closing device.

2. The valve of claim 1, wherein the closing device is configured as a closing flap.

3. The valve of claim 2, wherein the first flap comprises at least one supporting arm on which the closing device is pivotably supported.

4. The valve of claim 3, wherein the locking device comprises at least one bolt and a catch cooperating with the bolt, and wherein, when the first and second flaps are pivoted into the inflow position, the bolt can be accommodated by the catch in order to transfer the closing device into a locking position.

5. The valve of claim 4, wherein the at least one bolt is disposed on the closing device and the catch is disposed on the frame.

6. The valve of claim 4, wherein at least one spring cooperating with the at least one supporting arm is disposed on the closing device, in order to bias the closing device from a closing position into the locking position when the first and second flaps are pivoted into the inflow position.

7. The valve of claim 2, wherein:
   the first flap comprises at least one supporting arm on which the closing device is pivotably supported,
   the locking device comprises at least one bolt and an accommodating means cooperating with the bolt, and wherein, when the first and second flaps are pivoted into the inflow position, the bolt can be accommodated by the catch in order to transfer the closing device into a locking position,
   the at least one bolt is disposed on the closing device,
   the catch is disposed on the frame, and
   at least one spring cooperating with the at least one supporting arm is disposed on the closing device, in order to bias the closing device from a closing position into the locking position when the first and second flaps are pivoted into the inflow position.

8. The valve of claim 7, wherein an actuating device is provided with which the first and second flaps can be adjusted into an outflow and an inflow position, and the first and second flaps can be adjusted in the same direction by means of the actuating device.

9. The valve of claim 1, wherein the first flap comprises at least one supporting arm on which the closing device is pivotably supported.

10. The valve of claim 1, wherein the locking device comprises at least one bolt and a catch cooperating with the bolt, and wherein, when the first and second flaps are pivoted into the inflow position, the bolt can be accommodated by the catch in order to transfer the closing device into a locking position.

11. The valve of claim 10, wherein the at least one bolt is disposed on the closing device.

12. The valve of claim 10, wherein the catch is disposed on the frame.

13. The valve of claim 10, wherein at least one spring cooperating with the at least one supporting arm is disposed on the closing device, in order to bias the closing device from a closing position into the locking position when the first and second flaps are pivoted into the inflow position.

14. The valve of claim 1, wherein the first flap and the second flap are interconnected via at least one coupling rod.

15. The valve of claim 14, wherein an actuating device is provided with which the first and second flaps can be adjusted into an outflow position and the inflow position.

16. The valve of claim 15, wherein the first and second flaps can be adjusted in the same direction by means of the actuating device and the second flap is connected to the actuating device via an actuating rod.

17. The valve of claim 16, wherein the first flap is supported approximately centrally on the frame, and that the second flap is supported at the rear edge of the frame.

18. The valve of claim 1, wherein an actuating device is provided with which the first and second flaps can be adjusted into an outflow position and the inflow position.

19. The valve of claim 18, wherein the first and second flaps can be adjusted in the same direction by means of the actuating device, and the second flap is connected to the actuating device via an actuating rod.

20. The valve of claim 1, wherein the first flap is supported approximately centrally on the frame, and that the second flap is supported at the rear edge of the frame.

* * * * *